US011086077B1

(12) United States Patent
Green et al.

(10) Patent No.: US 11,086,077 B1
(45) Date of Patent: Aug. 10, 2021

(54) OPTICAL COMPONENT ARRAYS

(71) Applicant: II-VI DELAWARE, INC., Wilmington, DE (US)

(72) Inventors: Eric T. Green, Corning, NY (US); Martin R. Williams, Big Flats, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/909,744

(22) Filed: Jun. 23, 2020

(51) Int. Cl.
*G02B 6/255* (2006.01)
*G02B 6/36* (2006.01)
*G02B 6/44* (2006.01)

(52) U.S. Cl.
CPC ......... *G02B 6/2558* (2013.01); *G02B 6/3608* (2013.01); *G02B 6/4454* (2013.01)

(58) Field of Classification Search
None
See application file for complete search history.

(56) References Cited

U.S. PATENT DOCUMENTS

| 4,220,619 A * | 9/1980 | Kersten ................. G02B 6/3664 264/230 |
| 4,753,509 A * | 6/1988 | Parstorfer ............ G02B 6/4471 385/135 |
| 5,548,672 A * | 8/1996 | Hattori ................. G02B 6/2835 385/43 |
| 6,099,170 A * | 8/2000 | Sarbell ................. G02B 6/2558 385/95 |
| 2011/0026895 A1 * | 2/2011 | Baum ................... G02B 6/4454 385/135 |
| 2012/0243845 A1 * | 9/2012 | Wright ................. G02B 6/4442 385/135 |
| 2017/0317463 A1 * | 11/2017 | Green ................. H01S 3/06704 |
| 2020/0301088 A1 * | 9/2020 | Hutchison ............ G02B 6/4448 |

FOREIGN PATENT DOCUMENTS

EP 0638827 A1 * 8/1994
JP 2003-202430 A * 7/2003

* cited by examiner

*Primary Examiner* — Michael Stahl
(74) *Attorney, Agent, or Firm* — Blank Rome LLP

(57) ABSTRACT

The present disclosure generally relates to devices, which may be used in communication or optoelectronic modules for example, suitable for arrayed positioning of a plurality of fiber optical components. In one form, an optoelectronic module includes a printed circuit board ("PCB"). The module also includes an optical component array device which includes an elongated support member and an array of fused fiber optical components positioned around and coupled with the elongated support member. A recursive fiber may extend between an output of a first fused fiber optical component and an input of a second fused fiber optical component, and an optical fiber routing member may be coupled to the PCB and include a plurality of guides extending away from the PCB and defining a pathway for routing optical fibers relative to the PCB.

20 Claims, 9 Drawing Sheets

OPTICAL COMPONENT ARRAYS

FIELD

The present disclosure generally relates to organization and arrangement of optical components which may be used in communication modules, including for example optoelectronic modules. More particularly, but not exclusively, the present disclosure relates to devices suitable for arrayed positioning of a plurality of optical components such as fused fiber optical components.

BACKGROUND

Unless otherwise indicated herein, the materials described herein are not prior art to the claims in the present application and are not admitted to be prior art by inclusion in this section.

Communication modules, including optoelectronic modules such as optical or amplifier line cards, may include various components that engage in the transmission and reception of optical signals. Some of the components may be housed within a shell of the communication module. The communication module itself may be operably received within a host device that serves as one component of a communications network, operably coupled to one or more fiber optic cables which include one or more optical fibers, or both. The communication module may include a transmit port, a receive port, or both, each of which is configured to receive a connector of the optical fiber.

Some communication modules, such as optical or amplifier line cards, may include a large number of optical components which may consume a significant portion of the interior volume of the housing of the communication module or require an increase in the size of the housing. In addition, the large number of optical components which may be present in certain modules may, for example, present challenges positioning these components relative to one another and organizing various optical fibers associated therewith. As a result, assembly of optoelectronic modules of this nature may become complicated and require stocking a large volume of individual optical components having different functionalities. These modules may also require a larger number of optical fiber splices between optical components of sequential functions, and these splices may result in increased manufacturing costs and potentially lead to decreased reliability or increased loss. Thus, there remains a need for additional contributions in this technology.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, an optoelectronic module includes a printed circuit board ("PCB"). The module also includes an optical component array device coupled to the PCB. The optical component array device includes an elongated support member and an array of fused fiber optical components positioned around and coupled with the elongated support member.

In another embodiment, an optical component array device includes an elongated support member. A plurality of fused fiber optical components are positioned around an outer periphery of the elongated support member, and an adhesive material couples the plurality of fused fiber optical components to the elongated support member.

In still another embodiment, a method includes providing an elongated support member having opposing first and second ends, positioning a plurality of fused fiber optical components in an arrayed arrangement around an outer periphery of the elongated support member, and for each of the plurality of fused fiber optical components, applying an adhesive material at discrete locations between the first end and the second end of the elongated support member to couple the fused fiber optical component to the elongated support member.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
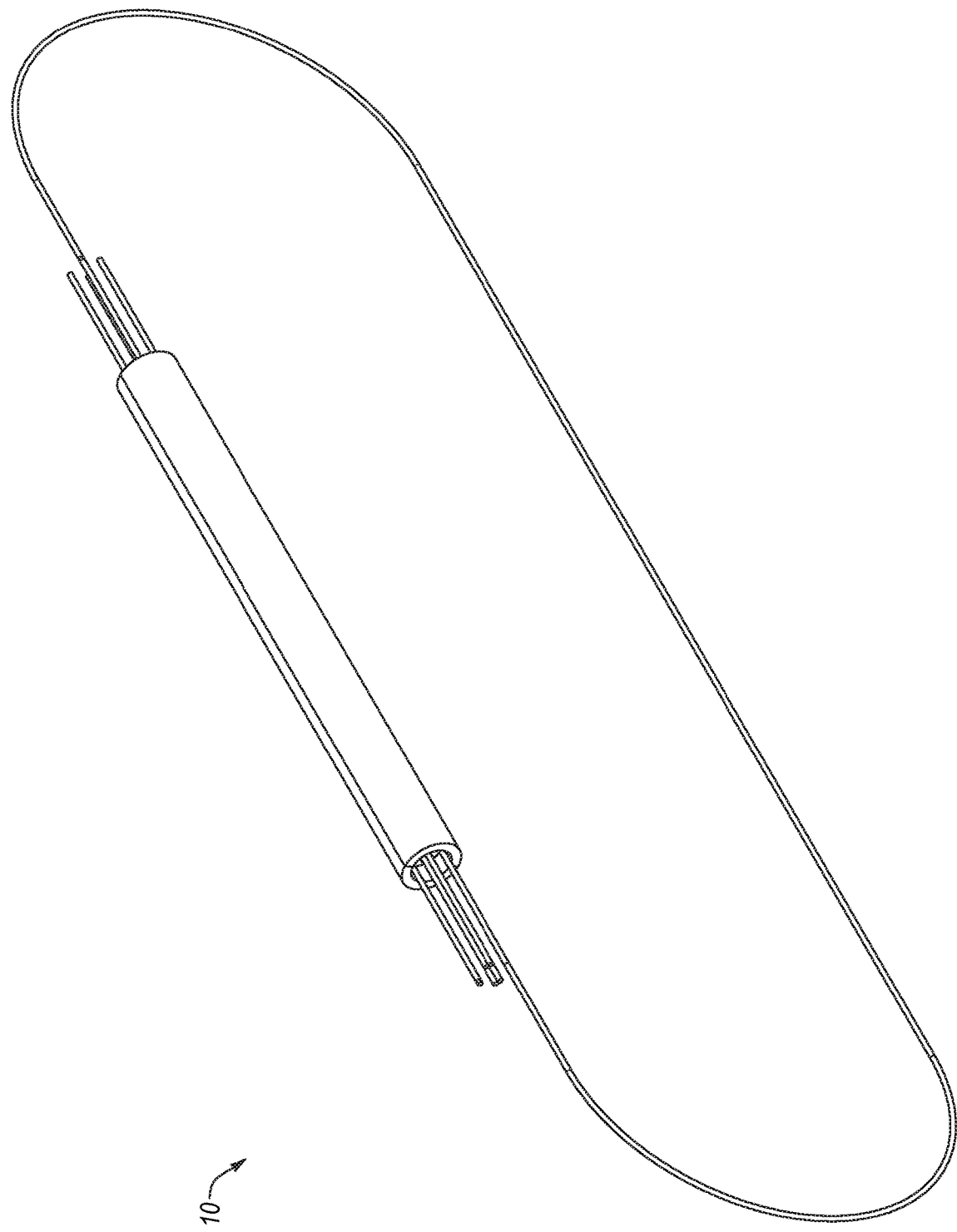
FIG. 1 is a perspective view of an optical component array device.
Figure 2:
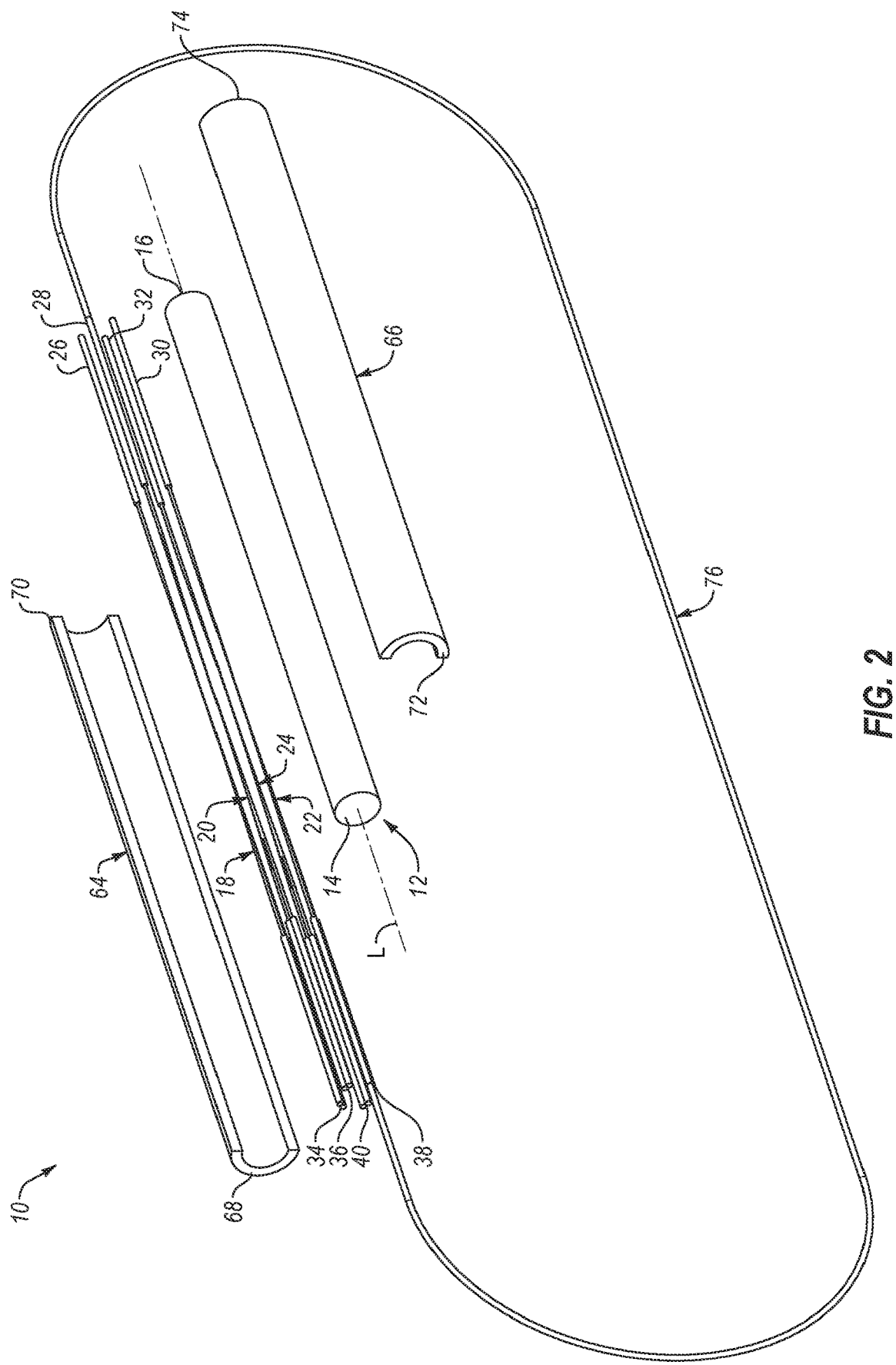
FIG. 2 is a perspective, exploded view of the optical component array device of FIG. 1.
Figure 3:
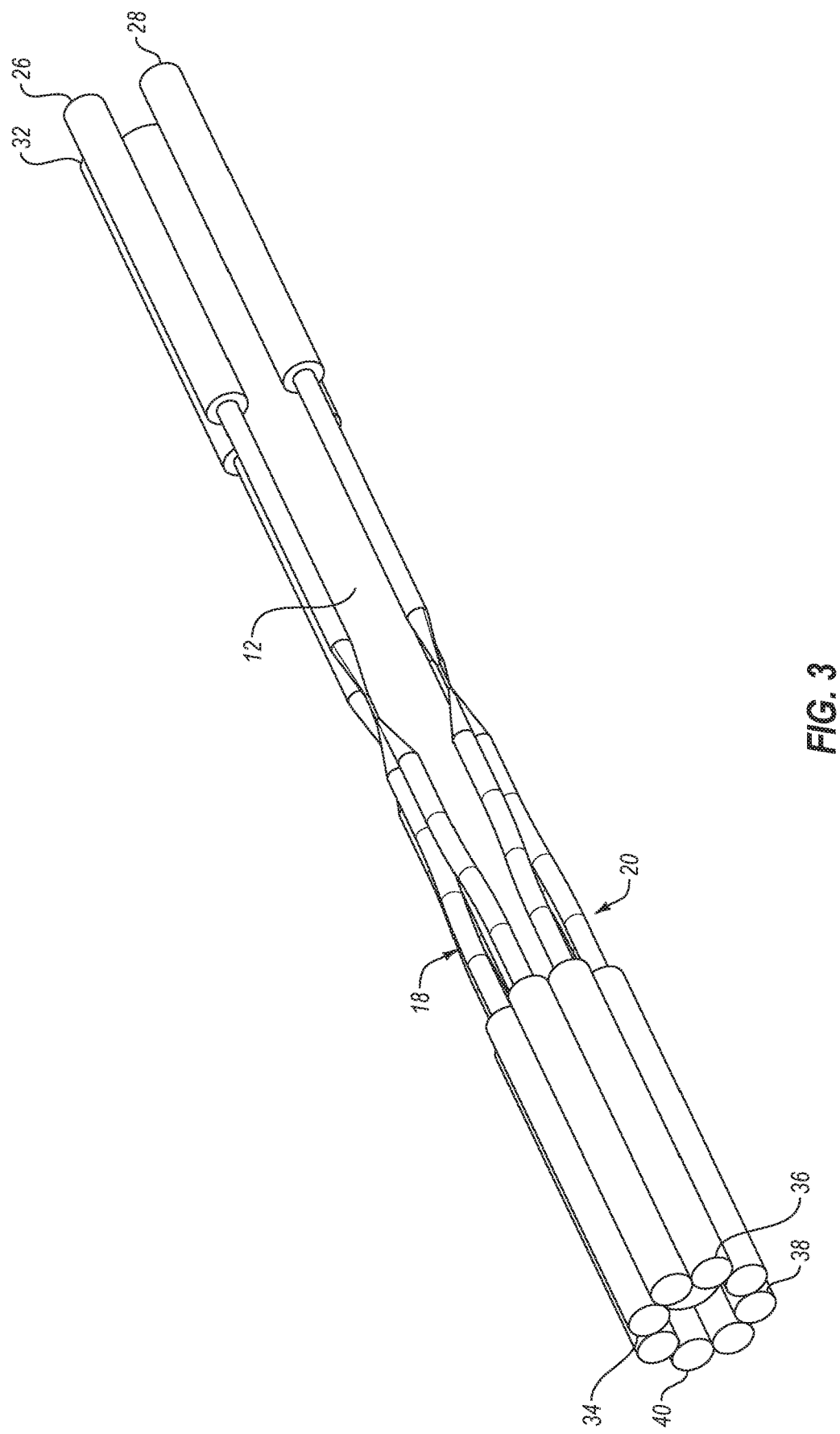
FIG. 3 is an enlarged perspective view of an elongated support member and an array of optical components of the optical component array device of FIG. 1.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to organization and arrangement of optical components which may be used in communication modules, including for example optoelectronic modules. More particularly, but not exclusively, the present disclosure relates to devices suitable for arrayed positioning of a plurality of optical components such as fused fiber optical components. Although the embodiments are described in the context of optoelectronic modules used in the field of optical networking, embodiments disclosed herein may be employed in other fields or operating environments where the functionality disclosed herein may be useful. Accordingly, the scope of the invention should not be construed to be limited to the example implementations and operating environments disclosed herein.

With general reference to FIGS. 1-4, there is illustrated an example embodiment of an optical component array device 10. As will be descried in greater detail below, device 10 houses and provides a radial array of a plurality of optical components which may, for example, be fused fiber optical components. Device 10 includes an elongated support member 12 having opposing first and second ends 14, 16, respectively. The elongated support member 12 also includes a generally cylindrical configuration which extends along a longitudinal axis L between the first end and the second end 16. While elongated support member 12 has a cylindrical configuration with a generally circular cross-sectional shape in the illustrated form, it is contemplated that the cross-sectional shape of elongated support member 12 may alternatively be oval or rectangular, just to provide a few examples.

Device 10 includes optical components 18, 20, 22 and 24 which are positioned around the outer periphery or circumference of elongated support member 12 such that optical components 18, 20, 22 and 24 are arranged in a radial array around elongated support member 12. Similarly, elongated support member 12 may provide a structure suitable for supporting optical components 18, 20, 22 and 24 and facilitating relative positioning between optical components 18, 20, 22 and 24. Optical components 18, 20, 22 and 24 may be evenly spaced from one another or the spacing between optical components 18, 20, 22 and 24 may vary. Optical components 18, 20, 22 and 24 may also be positioned adjacent to one another without any spacing provided between at least a portion thereof. While device 10 includes four optical components in the illustrated form, forms where device 10 includes a different number of optical components are also possible. Moreover, the size and configuration of elongated support member 12 may vary in response to the number of optical components present. For example, the diameter of elongated support member 12 may be smaller when fewer optical components are present or larger when a greater number of optical components are present.

Optical components 18, 20, 22 and 24 respectively include input ends 26, 28, 30, and 32 and output ends 34, 36, 38 and 40. In the illustrated form, each of output ends 34, 36, 38 and 40 includes a pair of outputs which may be coupled to a respective optical fiber, although it is also possible that one or more of output ends 34, 36, 38 and 40 may include a single output which may be coupled to a respective optical fiber. Each of input ends 26, 28, 30, and 32 includes a single input, although one or more of input ends 26, 28, 30, and 32 may include more than one input.

In FIGS. 1-4 for example, optical components 18, 20, 22 and 24 are arranged in the same direction relative to one another; i.e., with input ends 26, 28, 30 and 32 all positioned toward one end of elongated support member 12 and output ends 34, 36, 38 and 40 all positioned toward the opposite end of elongated support member 12. However, forms in which some of optical components 18, 20, 22 and 24 are positioned in an opposite direction relative to others of optical components 18, 20, 22 and 24 are possible. For example, in the form illustrated in FIG. 5, input ends 26 and 30 of optical components 18 and 22 and output ends 36 and 40 of optical components 20 and 24 positioned toward one end of elongated support member 12 while input ends 28 and 32 of optical components 20 and 24 and output ends 34 and 38 of optical components 18 and 22 are positioned toward the opposite end of elongated support member 12. In the form illustrated in FIG. 5 for example, there are six input or output ends positioned at each end of elongated support member 12 without any spacing therebetween. In the form of FIGS. 1-4, there are eight output ends positioned at first end 14 of elongated support member 12 without any spacing therebetween, and there are four input ends positioned at second end 16 of elongated support member 12 with spacing therebetween. In light of the arrangement of FIG. 5, the elongated support member 12 may have a smaller diameter relative to its diameter in the arrangement illustrated in FIGS. 1-4 while still being coupled with the same number of optical components.

In the illustrated forms for example, optical components 18, 20, 22 and 24 are representative of fused fiber optical components which include a fused fiber coupling region where light may be exchanged between optical fibers. However, optical components which may be included in device 10 may be provided in any number of different forms and with any number of different functionalities. Optical components 18, 20, 22 and 24 may each individually perform a single function which may be the same or different from the function performed by the other optical components. Optical components 18, 20, 22 and 24 may therefore collectively perform a single function or multiple different functions. The optical components in device 10 may all have the same functionality, or the functionality of different components within device 10 may vary such that device 10 provides multiple different functionalities which may, for example, be complementary to one another. Particular forms of optical components 18, 20, 22 and 24 include tap couplers and wavelength division multiplexers, just to provide a few examples. Device 10 may also include in one or more receptacles thereof a fusion splice between similar or dissimilar types or diameters of optical fibers.

Figure 4:
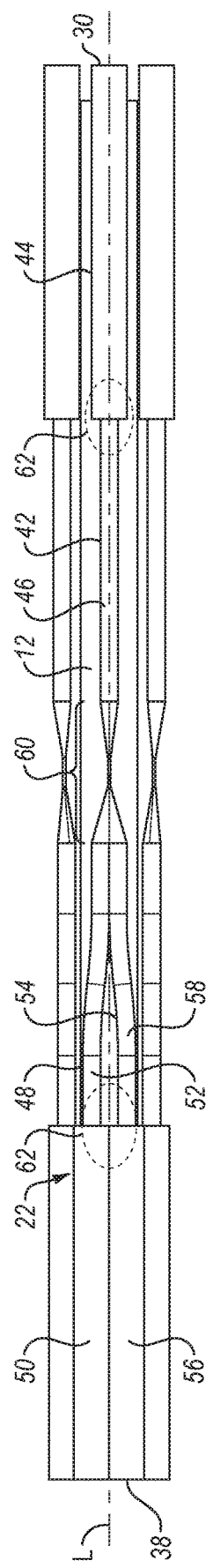
FIG. 4 is a side view of the elongated support member and the array of optical components of FIG. 3.
Figure 5:
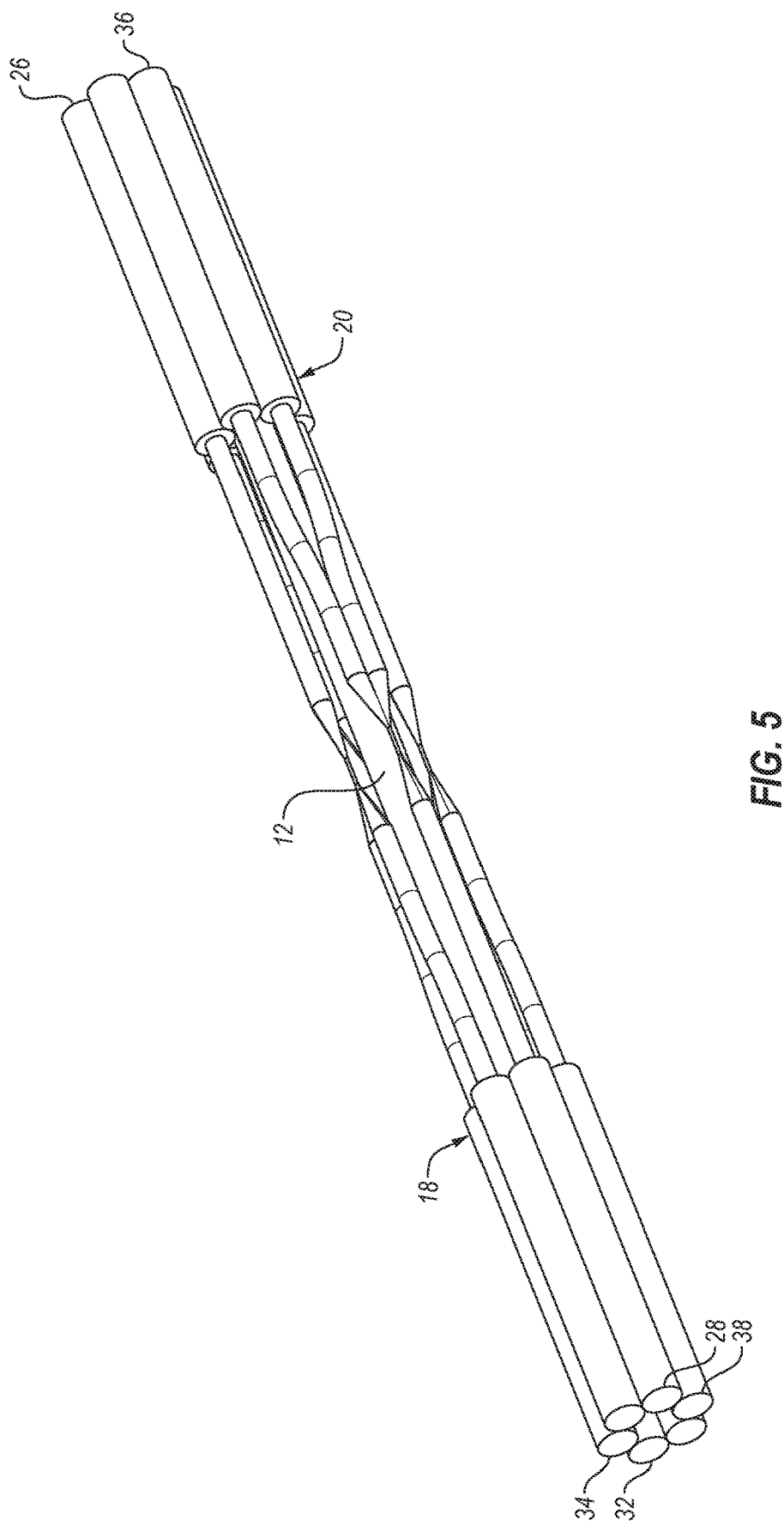
FIG. 5 is an enlarged perspective view of the elongated support member and an alternative array of optical components which may be used in the optical component array device of FIG. 1.

Optical components 18, 20, 22 and 24 include optical fibers which are coated in some portions and uncoated or bare in other portions. With reference to FIG. 4 for example, optical component 22 includes an optical fiber 42 having a coated portion 44 extending from input end 30 to an uncoated portion 46. Optical component 22 also includes an optical fiber 48 having a coated portion 50 extending from output end 38 to an uncoated portion 52 and an optical fiber 54 having a coated portion 56 extending from output end 38 to an uncoated portion 58. Uncoated portion 46 of optical fiber 42, uncoated portion 52 of optical fiber 48, and uncoated portion 58 of optical fiber 54 extend to a fused fiber coupling region 60 where light may be exchanged between optical fibers 42, 48 and 54. Uncoated portion 46 of optical fiber 42, uncoated portion 52 of optical fiber 48, and uncoated portion 58 of optical fiber 54, and in turn fused fiber coupling region 60, are positioned between opposite ends of elongated support member 12. Coated portion 44 of optical fiber 42 extends beyond second end 16 of elongated support member 12 and coated portions 50 and 56 of optical fibers 48 and 54, respectively, extend beyond first end 14 of elongated support member 12. However, other forms in which the positioning of various features of optical component 22 relative to elongated support member 12 are possible. Also, for the sake of clarity, the foregoing description relating to optical component 22 is also applicable to optical components 18, 20 and 24 when these components are fused fiber optical components.

Optical components 18, 20, 22 and 24 may be coupled to elongated support member 12 in any suitable fashion. In one form for example, optical components 18, 20, 22 and 24 are coupled to elongated support member 12 with an adhesive material 62 (FIG. 4) which may be an epoxy material. During assembly of device 10 for example, optical components 18, 20, 22 and 24 may be individually and successively positioned relative to and coupled with elongated support member 12 by applying the adhesive material 62 between the respective optical component and elongated support member 12. In the illustrated form, adhesive material 62 is applied to a boundary between the coated and uncoated portions of the optical fibers of the optical components. For example, as shown in FIG. 4, adhesive material 62 is applied at the boundary of coated portion 44 and uncoated portion 46 of optical fiber 42, and at the boundary of coated portions 50 and 56 of optical fibers 48 and 54, respectively, and uncoated portions 52 and 58 of optical fibers 48 and 54, respectively. Different variations in the application of adhesive material 62 to couple optical components 18, 20, 22 and 24 with elongated support member 12 are also possible.

Following coupling of optical components 18, 20, 22 and 24 with elongated support member 12, additional adhesive material (which may be the same as adhesive material 62) may be applied to at least a portion of optical components 18, 20, 22 and 24, elongated support member 12, or both, for coupling a cover including a pair of cooperating cover members 64 and 66 with elongated support member 12 and optical components 18, 20, 22 and 24. In one form, the additional adhesive material may be applied between the coated portions of the optical fibers of optical components 18, 20, 22 and 24 and cover members 64 and 66, although forms in which the additional adhesive material is applied to and at least partially covers the uncoated portions of the optical fibers of optical components 18, 20, 22 and 24 are also possible. In some aspects, cover members 64 and 66 cooperate to environmentally or hermetically seal elongated support member 12 and the portions of optical components 18, 20, 22 and 24 positioned therein. In some forms the additional adhesive material used may be an epoxy material.

Cover members 64 and 66 have an arcuate configuration which corresponds to the cylindrical shape of elongated support member 12, although the shape and configuration of cover members 64 and 66 may change as the shape and configuration of elongated support member 12 changes. Cover member 64 extends between a first end 68 and an opposite second end 70, and cover member 66 extends between a first end 72 and an opposite second end 74. Each of cover members 64 and 66 includes a length between first ends 68, 72 and second ends 70, 74 which is greater than a length of elongated support member 12 between first end 14 and second end 16. As such, when cover members 64 and 66 are positioned about elongated support member 12, first end 14 of elongated support member 12 is inwardly offset from first ends 68 and 72 of cover members 64 and 66, respectively, and second end 16 of elongated support member 12 is inwardly offset from second ends 70 and 74 of cover members 64 and 66, respectively. However, as may be best viewed in connection with FIG. 1 for example, input ends 26, 28, 30 and 32 and output ends 34, 36, 38 and 40 extend past first ends 68 and 72 and second ends 70 and 74 of cover members 64 and 66, respectively.

In one non-illustrated form, the cover may be formed of a single piece configured to slide over and receive elongated support member 12 and optical components 18, 20, 22 and 24. The cover may be formed of a transparent glass material or a metallic material, amongst other possibilities.

Device 10 also includes a recursive fiber 76 which extends from an output of output end 38 of optical component 22 to an input of input end 28 of optical component 20. In this arrangement, sequential components such as optical component 22 and optical component 20 may be concatenated without fusion splicing since recursive fiber 76 couples the output of one optical component with the input of another optical component. Amongst other things, elimination of fusion splicing between optical component 22 and optical component 20 may increase reliability, minimize the relevant optical path length, and decrease manufacturing complexity. Forms in which recursive fiber 76 is not present are also possible, as well as forms where a recursive fiber extends between other optical components of device 10.

Figure 6:
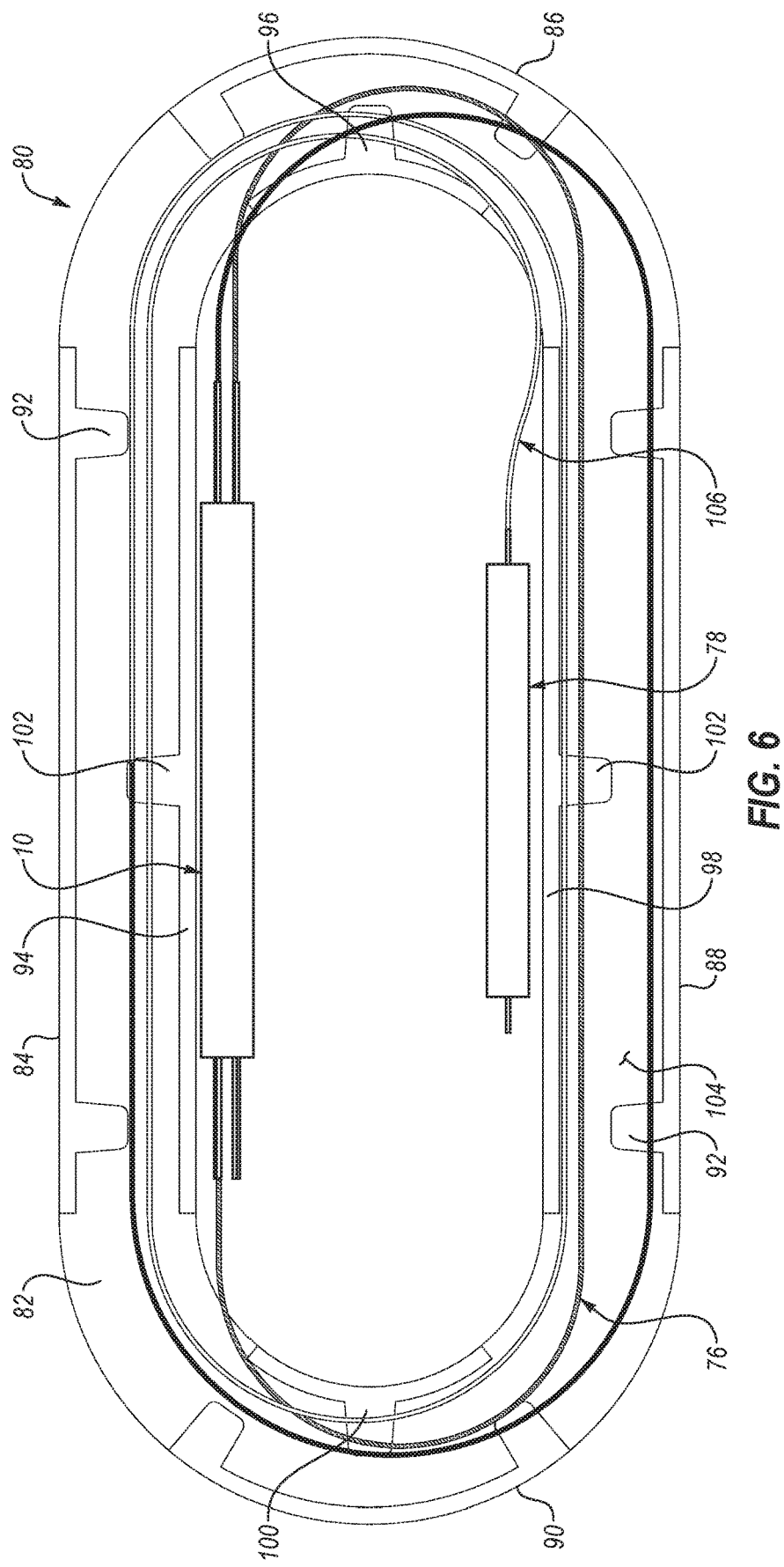
FIG. 6 is a plan view of the optical array device of FIG. 1 positioned relative to an optical fiber routing member and a single optical component.

In FIG. 6, optical component array device 10 is positioned relative to a single optical component 78 and an optical fiber routing member 80 which may be used to route various optical fibers associated with device 10, optical component 78, and any other components which may be present. Routing member 80 includes a base 82 which may be mounted to a PCB of, for example, an optoelectronic module. A plurality of outer guides 84, 86, 88, and 90 extend from base 82 and include inwardly extending tabs 92, only a few of which have been identified in FIG. 6 to preserve clarity. A plurality of inner guides 94, 96, 98, and 100 also extend from base 82 and include outwardly extending tabs 102, only a few of which have been identified in FIG. 6 to preserve clarity. Outer guides 84, 86, 88, and 90 cooperate with inner guides 94, 96, 98, and 100 to define a pathway 104 in which optical fibers may be routed and organized.

For example, recursive fiber 76, which extends between output and input ends of different optical components of device 10, enters pathway 104 through a space between inner guides 94 and 100 and continues in a counter clockwise direction in pathway 104 until it exits through a space between inner guides 96 and 94. In this arrangement, recursive fiber 76 is able to connect between different optical components of device 10 while continuing in pathway 104 for less than one entire loop. Another optical fiber 106 extends between optical component 78 and one of the optical components of device 10 and may, for example, include one or more splices positioned therein. Optical fiber 106 enters pathway 104 through a space between inner guides 96 and 98 and continues for two loops around pathway 104 until it exits through a space between inner guides 94 and 96.

Tabs 92, 102 may engage with and prevent recursive fiber 76, optical fiber 106, and any other optical fibers which may be present from being displaced from pathway 104. Additionally, a number of spaces exist between outer guides 84, 86, 88 and 90 such that optical fibers in pathway 104 could also extend to other components which are not positioned within routing member 80.

Figure 7:
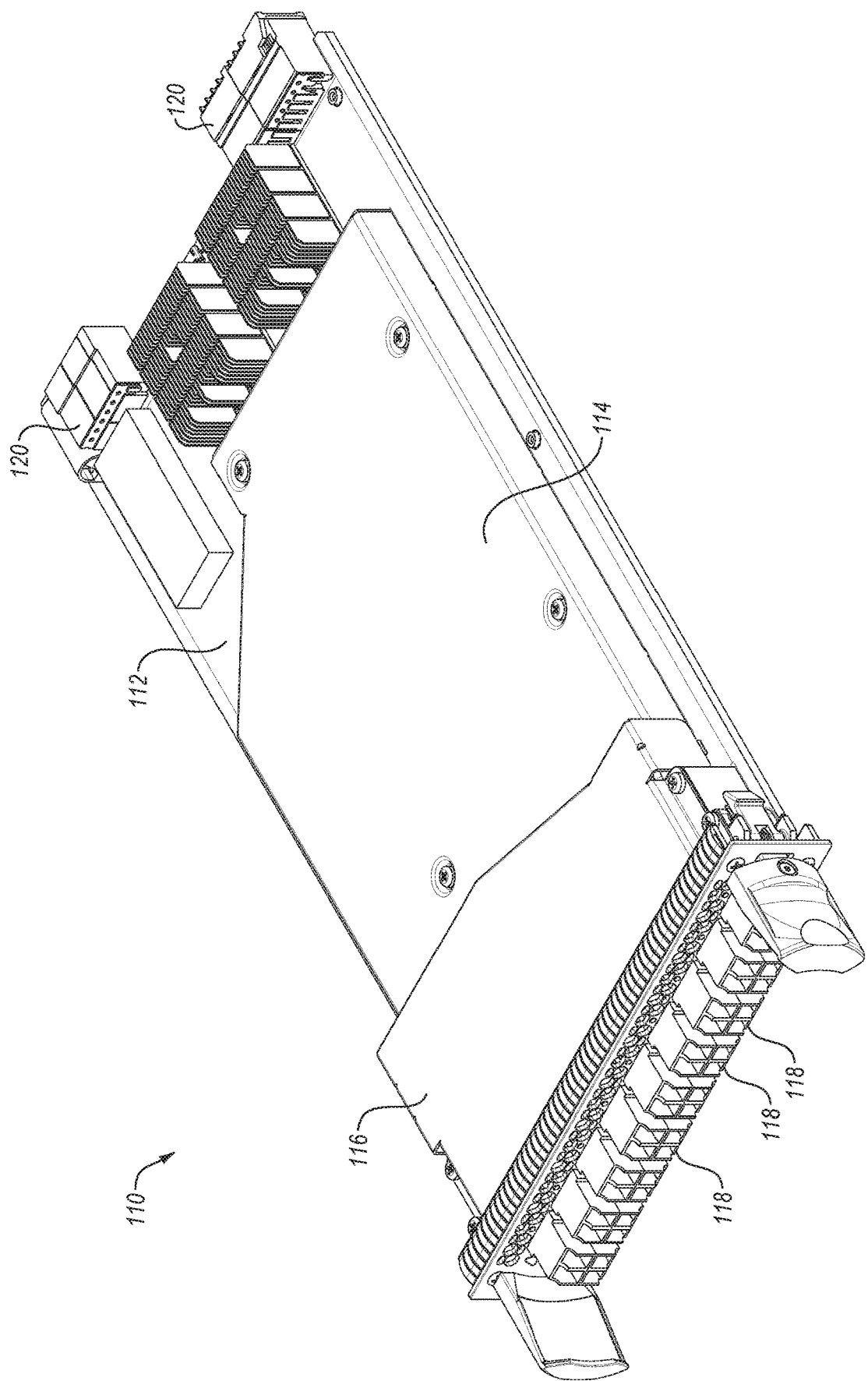
FIG. 7 is a perspective view of a communication module.

Device 10 may be used in any number or variety of communication or optoelectronic modules. In some forms, the modules in which device 10 may be used include a relatively large number of optical components. One example of a module of this nature may be an optical or amplifier line card, including for example line card 110 illustrated in FIGS. 7-9. Line card 110 includes a PCB 112 having covers 114 and 116 coupled therewith and housing a variety of components coupled to or otherwise arranged relative to PCB 112. Line card 110 may also include a housing (not shown) which houses PCB 112 while still providing access to ports or connectors 118 and 120 (only a few of which have been identified to preserve clarity) positioned at opposite ends of PCB 112. By way of example, connectors 118 and 120 may be optical or electrical connectors.

Figure 8:
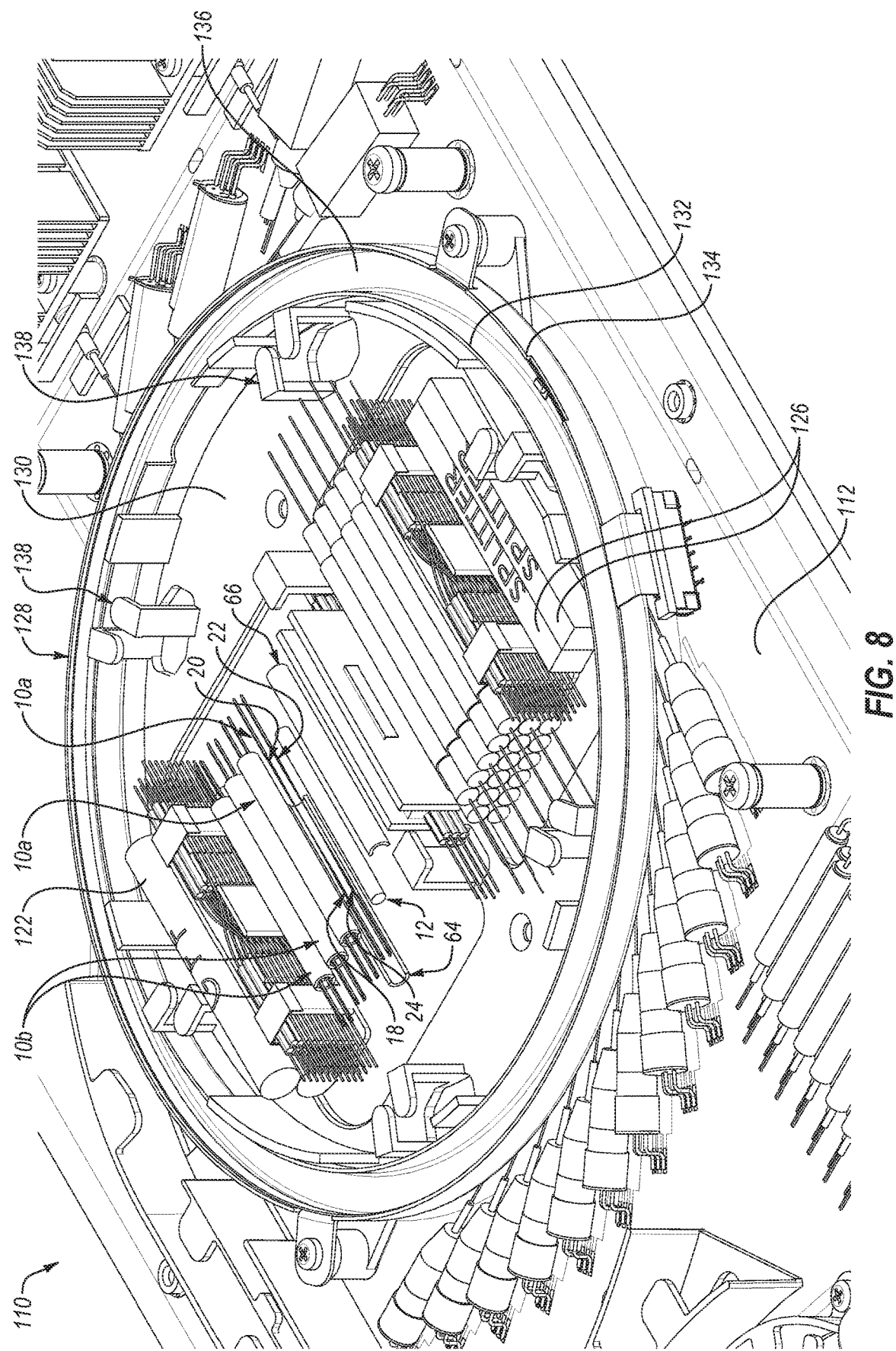
FIG. 8 is an enlarged, perspective view of a portion of the communication module of FIG. 7 including a plurality of the optical component array devices illustrated in FIGS. 1-4.

In FIG. 8, where covers 114 and 116 have been removed from line card 110 and an enlarged perspective view of a portion of line card 110 is illustrated, it can be seen that line card 110 includes a number of optical components positioned relative to PCB 112. For example, amongst other components, line card 110 includes a pair of gain flattening filters 122 and a number of splitters 126, each of which is positioned inside of an optical fiber routing member 128 which may be used to route various optical fibers (not shown) associated with optical components of line card 110. Routing member 128 includes a base 130 which may be mounted on or coupled with PCB 112. Routing member 128 also includes an inner track or guide 132 and an outer track or guide 134 which extend from base 130 in a direction away from PCB 112 and cooperate to define a circular pathway 136 in which optical fibers may be routed and organized. A plurality of guides 138, only a few of which have been identified to preserve clarity, also extend from base 130 in a direction away from PCB and are positioned inwardly of inner guide 132 and are further configured for routing and organizing one or more optical fibers.

Figure 9:
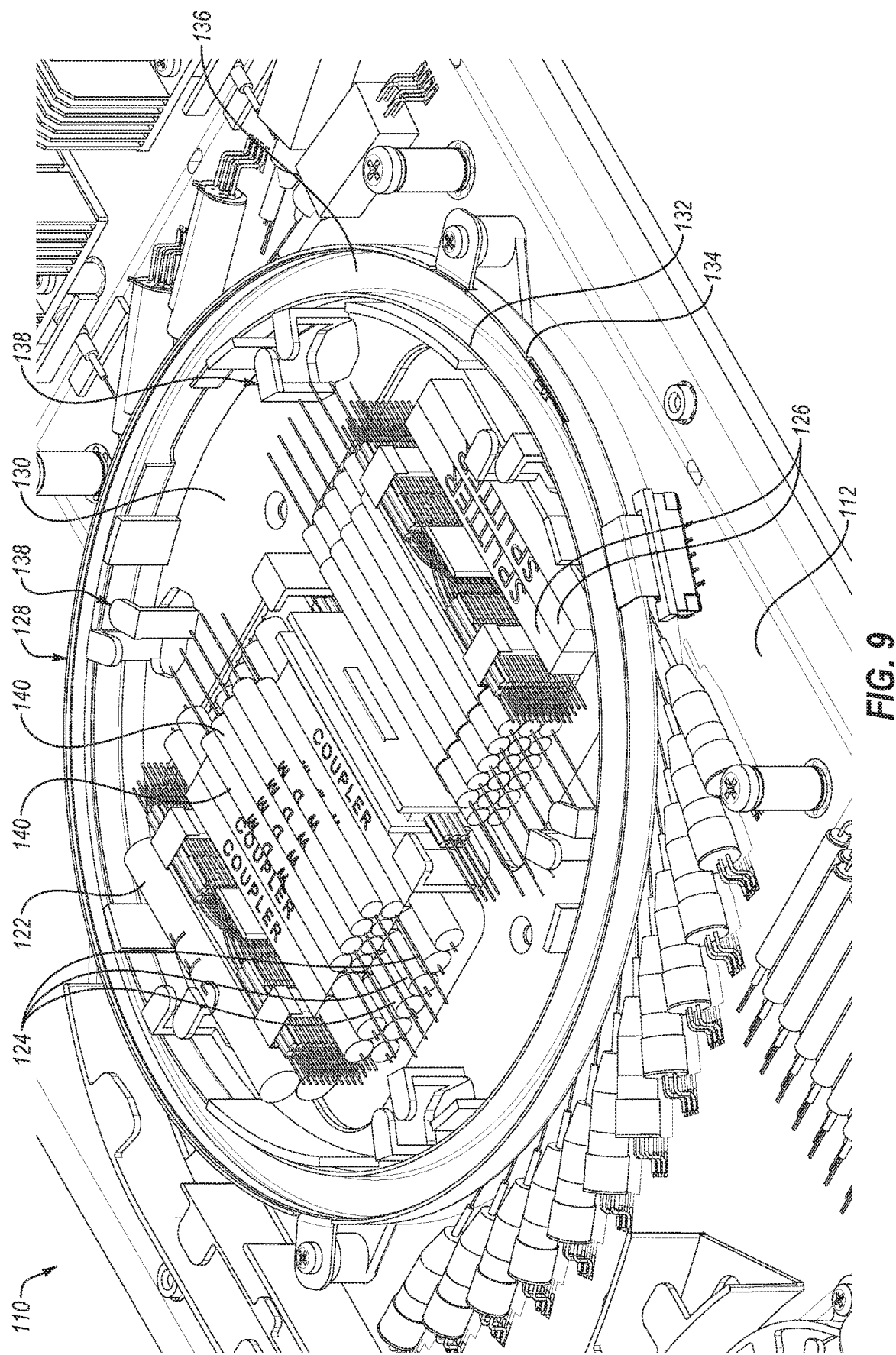
FIG. 9 is an enlarged, perspective view of a portion of the communication module of FIG. 7 including a plurality of single optical components in place of the optical component array devices as illustrated in FIG. 8.

Line card 110 also includes a plurality of optical component array devices 10 identified by reference numerals 10a and 10b. The optical component array devices 10a are positioned adjacent to the optical component array devices 10b, and one or more of the optical component array devices 10a and 10b may be directly or indirectly coupled to or otherwise carried by the PCB 112. In FIG. 8, an exploded view of one of the devices 10a is provided in order to illustrate components thereof including elongated support member 12, optical components 18, 20, 22 and 24 (which may be fused fiber optical components for example), and cover members 64 and 66. In one form, each of devices 10a may house and provide four fused fiber optical components in the form of wavelength division multiplexers, although other variations are possible, and each of devices 10b may house and provide four fused fiber optical components in the form of couplers, although other variations are possible. The number of devices 10 present and the fiber optic component functionality provided thereby in the illustrated form are representative only, and variations in both the number and functionality of devices 10, and the number of optical components included by both, may vary in alternative forms. By way of example, line card 110 as illustrated in FIG. 9 also includes eight fused fiber optical components in the form of wavelength division multiplexers 140, only a few of which have been identified to preserve clarity, and eight fused fiber optical components in the form of couplers 124, only a few of which have been identified to preserve clarity. However, in contrast to the form illustrated in FIG. 8, each of wavelength division multiplexers 140 is provided as a single stand-alone component having relatively the same size as each of devices 10a, and each of couplers 124 is provided as a single stand-alone component having relatively the same size as each of devices 10b, thus resulting in an increased total volume consumed by the optical components relative to the form shown in FIG. 8.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module, comprising:
   a printed circuit board ("PCB"); and
   an optical component array device coupled to the PCB, the optical component array device including:
      an elongated support member; and
      an array of fused fiber optical components positioned around and coupled with the elongated support member, wherein a fused fiber optical component of the array of fused fiber optical components includes an optical fiber having an uncoated portion and a coated portion.

2. The optoelectronic module of claim 1, wherein the array includes a plurality of radially arranged fused fiber optical components.

3. The optoelectronic module of claim 1, further comprising an optical fiber routing member coupled to the PCB, wherein the routing member includes a plurality of guides that extend away from the PCB and that define a pathway to route optical fibers relative to the PCB.

4. The optoelectronic module of claim 1, wherein the elongated support member includes an elongated cylindrical body.

5. The optoelectronic module of claim 1, further comprising a cover positioned around the elongated support member.

6. The optoelectronic module of claim 1, further comprising a recursive fiber that extends between an output of a first fused fiber optical component coupled to the elongated support member and an input of a second fused fiber optical component coupled to the elongated support member.

7. The optoelectronic module of claim 1, wherein the fused fiber optical component is coupled to the elongated support member by an adhesive applied at a boundary between the coated portion and the uncoated portion of the optical fiber.

8. An optical component array device, comprising:
an elongated support member;
a plurality of fused fiber optical components positioned around an outer periphery of the elongated support member;
a recursive fiber that extends between an output of a first fused fiber optical component coupled to the elongated support member and an input of a second fused fiber optical component coupled to the elongated support member; and
an adhesive material coupling the plurality of fused fiber optical components to the elongated support member.

9. The optical component array device of claim 8, wherein the elongated support member includes a cylindrical body and the plurality of fused fiber optical components are radially arranged around the cylindrical body.

10. The optical component array device of claim 8, further comprising a cover positioned around the elongated support member and the plurality of fused fiber optical components.

11. The optical component array device of claim 8, wherein the elongated support member has opposing first and second ends and at least one of the plurality of fused fiber optical components includes an optical fiber having an uncoated portion positioned between the first end and the second end of the elongated support member.

12. The optical component array device of claim 11, wherein the optical fiber further includes a pair of coated portions between which the uncoated portion is positioned.

13. The optical component array device of claim 12, wherein a first one of the coated portions of the optical fiber extends beyond the first end of the elongated support member and a second one of the coated portions of the optical fiber extends beyond the second end of the elongated support member.

14. The optical component array device of claim 8, wherein the array includes a plurality of radially arranged fused fiber optical components.

15. The optical component array device of claim 8, wherein the elongated support member includes an elongated cylindrical body.

16. A method, comprising:
providing an elongated support member having opposing first and second ends;
positioning a plurality of fused fiber optical components in an arrayed arrangement around an outer periphery of the elongated support member;
for each of the plurality of fused fiber optical components, applying an adhesive material at discrete locations between the first end and the second end of the elongated support member to couple the fused fiber optical component to the elongated support member; and
hermetically sealing the plurality of fused fiber optical components and the elongated support member with a pair of cooperating cover members.

17. The method of claim 16, wherein the discrete locations correspond to a boundary between a coated portion and an uncoated portion of an optical fiber of the fused fiber optical component.

18. A method, comprising:
providing an elongated support member having opposing first and second ends;
positioning a plurality of fused fiber optical components in an arrayed arrangement around an outer periphery of the elongated support member;
for each of the plurality of fused fiber optical components, applying an adhesive material at discrete locations between the first end and the second end of the elongated support member to couple the fused fiber optical component to the elongated support member; and
positioning a recursive fiber between an output of a first fused fiber optical component and an input of a second fused fiber optical component.

19. The method of claim 18, further comprising hermetically sealing the plurality of fused fiber optical components and the elongated support member with a pair of cooperating cover members.

20. The method of claim 18, wherein the discrete locations correspond to a boundary between a coated portion and an uncoated portion of an optical fiber of the fused fiber optical component.

* * * * *